United States Patent

[11] 3,620,989

| [72] | Inventor | Lowell O. Cummings<br>San Anselmo, Calif. |
|---|---|---|
| [21] | Appl. No. | 858,125 |
| [22] | Filed | Sept. 15, 1969 |
| [45] | Patented | Nov. 16, 1971 |
| [73] | Assignee | Pacific Vegetable Oil Corporation<br>San Francisco, Calif. |

[54] ALKYDS OF UNSATURATED DIBASIC ACIDS, POLYOLS, AND UNSATURATED FATTY ACID ESTERS AND METHOD FOR MAKING SAME: EMULSION COPOLYMERIZATION OF SAID ALKYDS WITH POLYMERIZABLE MONOMERS AND THE RESULTING POLYMERS
26 Claims, No Drawings

[52] U.S. Cl. .................................................. 260/22CB,
117/124 E, 117/161 K, 117/161 UC, 260/22 M,
260/29.2 E, 260/23 P
[51] Int. Cl. ....................................................... C09d 3/64
[50] Field of Search ............................................. 260/23 AR,
22 RU, 22 M

[56] References Cited
UNITED STATES PATENTS

| 2,559,466 | 7/1951 | Root............................. | 260/22 |
|---|---|---|---|
| 2,850,469 | 9/1958 | Christenson.................. | 260/22 |
| 3,350,335 | 10/1967 | Silver............................ | 260/22 |
| 3,393,165 | 7/1968 | Evans et al.................... | 260/22 |

*Primary Examiner*—Czaja Donald E.
*Assistant Examiner*—Ronald W. Griffin
*Attorney*—Owen, Wickersham & Erickson ABSTRACT: A distinctive alkyd is made by reacting at a temperature below 350° F., an unsaturated dibasic acid or anhydride (e.g., maleic anhydride or fumaric acid) with an unsaturated fatty acid ester (e.g. safflower oil) that has been alcoholized with a polyol (e.g., ethylene glycol). This alkyd can then be emulsion copolymerized with various polymerizable monomers (e.g. vinyl acetate, styrene) to produce a high molecular weight polymer that is thermosetting and forms tough homogeneous films.

ALKYDS OF UNSATURATED DIBASIC ACIDS, POLYOLS, AND UNSATURATED FATTY ACID ESTERS AND METHOD FOR MAKING SAME: EMULSION COPOLYMERIZATION OF SAID ALKYDS WITH POLYMERIZABLE MONOMERS AND THE RESULTING POLYMERS

This invention relates to a novel alkyd, a method for its manufacture, its emulsion copolymerization with various monomers, and the resulting polymers.

The alkyd is useful as a coating, which can be air dried. Even better coatings are made from the copolymers of this invention.

Heretofore, when alkyds, as well as the unsaturated fatty acid esters from which alkyds are made, have been copolymerized with materials such as styrene, vinyl toluene, and acrylates, the resulting coating materials have had only limited application. These resulting copolymers have been recognized to be low-molecular weight materials, since they are soluble in common solvents such as mineral spirits; hence, their limited use. Their low-molecular weight has probably been due to the presence of allylic grouping (—CH$_2$—CH CH—), for it is believed that the allylic grouping of the double bonds in unsaturated fatty acid chains has inhibited free radical polymerization. The allylic group reacts readily with the monomer free radicals or other free radicals to produce adduct radicals having a much lower order of reactivity, and polymerization is therefore retarded or essentially stopped, with the ultimate formation of only the lower molecular weight polymers. Films formed of such lower molecular weight polymers have generally not been tough but have tended to be sticky or soft or, in some instances, brittle.

Alkyds have heretofore been made chiefly from phthalic acid or anhydride. These alkyds have had their uses, which need not be gone into here, but their inability to form high-molecular weight copolymers with vinyl, styrene, acryloyl, and other radicals, has been a serious disadvantage.

The basis of the present invention is that alkyds capable of forming high-molecular weight copolymers with these well-known common monomers can be made from the partial polyol esters of fatty acids and maleic anhydride or other unsaturated dibasic fatty acids. I have found a problem here in the prevention of gelation, for if an attempt is made to form an alkyd from maleic or fumaric acid, or anhydride, there is a strong tendency for the reaction to degenerate into a Diels-Alder condensation reaction, in which the double bonds of the maleic or fumaric groups link up with the double bonds in the unsaturated fatty acid esters. However, I have found that, by keeping the temperature of the reaction at 350° F. or below, not only is this Diels-Alder condensation reaction suppressed, but a good alkyd reaction does take place; moreover, the reaction produces a novel alkyd which is capable of the type of copolymerization desired to obtain a copolymer of high-molecular weight, as indicated by its high viscosity and its insolubility in various organic solvents. A strong, tough, and nonbrittle coating can therefore be made. While the temperature of reaction can be as low as 300° F. and still get the desired reaction, the time then becomes unduly prolonged; so temperatures between 340° F. and 350° F. are preferred.

While the alkyd of this invention is similar in some ways to the conventional phthalic-fatty acid alkyds now used in the coatings industry, it is different in its ability to copolymerize and in the fact that it is based on an unsaturated dibasic acid or anhydride instead of phthalic anhydride. At the low temperature of reaction provided in this invention, very little maleic double bond tieup takes place, while esterification proceeds at a good rate.

Thus, the invention is concerned with the preparation of novel alkyds by controlling reaction between partial polyol esters of unsaturated fatty acids and unsaturated dibasic fatty acids. In addition, it is concerned with the emulsion copolymerization of these novel alkyds with vinyl, styrene, or other polymerizable monomers.

According to this invention, the alkyd of an unsaturated dibasic carboxylic acid and a partial ester of an unsaturated fatty acid with a polyalcohol is prepared by admixing such dibasic acid and partial ester, advantageously in approximately stoichiometric proportions, and heating at not over 350° F. until the desired reaction is effected, as indicated by reaching a desired low acid number, or a desired viscosity or both. The partial ester can be prepared by reacting a polyalcohol with the desired fatty acid or mixture of such acids, or by alcoholysis of an ester such as a glyceride oil with sufficient polyalcohol to react with some of the fatty acid radicals and to form the desired partial ester.

It is important to avoid reaction of the dibasic acid double bond with the double bonds in the unsaturated fatty acid radicals in forming the alkyds. It is an advantage of this invention that such reaction is avoided, particularly by esterifying the dibasic acid and the partial ester at a temperature of not over 350° F., with satisfactory formation of the desired alkyd at a good reaction rate.

The invention contemplates the copolymerization of the novel alkyd with a suitable monomer by mixing the dibasic-acid alkyd with a vinyl or other suitable monomer in a ratio of 10 to 90 parts alkyd to 90 to 10 parts of monomer; emulsifying the mixture in water, preferably with the aid of a small but sufficient amount of an anionic or nonionic emulsifying agent (e.g., 3 percent–10 percent of the nonaqueous phase) to form a stable emulsion having, for example, a solids content between about 20 percent and 60 percent; and, then, effecting the copolymerization reaction within the emulsion as described hereinafter. The amount and type of emulsifier is not critical and is well within the skill of the technician.

In one mode of operation according to this phase of the invention, the total amounts of alkyd, monomer, water and emulsifier are admixed at once and agitated or beaten to form the emulsion. In an alternative mode of operation it has sometimes been found advantageous to admix at least a major portion, or over 50 percent, of the vinyl monomer with the emulsifier a minor portion, or less than 50 percent, of the alkyd component, to emulsify such admixture with water and to then initiate copolymerization in the manner described below. In this latter embodiment, when polymerization has been well started and is proceeding rapidly, there is then added a second aqueous emulsion of any remaining vinyl monomer and the remaining fatty acid alkyd component, and polymerization is continued to completion with this mixture of emulsions. In this alternative procedure, the dibasic acid-unsaturated fatty acid-polyalcohol alkyd combines with or ties into already formed high-molecular weight vinyl polymers and, in part, both reactions proceed at the same time with production of very high-molecular weight polymers, as indicated by their toughness, their extensibility, and their failure to dissolve in common organic solvents. A planetary mixer has been found advantageous in making the emulsions which are useful herein.

In the copolymerizing stage or step, the starting emulsion made as described above or in any other desired manner is adjusted to pH not over 4.0, suitably by adding maleic anhydride or phosphoric acid, if necessary. The emulsion is then placed under an oxygen-free atmosphere; and is desirably free of any dissolved or occluded oxygen by stripping with a suitable inert gas such as nitrogen or helium. In some instances it may be desirable to enhance the redox reaction by adding ferric and/or ferrous ions in very small amounts, suitably from 0.001 percent to 0.0001 percent, based on total weight of the alkyd, polyol and monomer components.

There is then added to the admixture a small amount, effective to initiate the polymerization reaction, of an oxygen-providing peroxide, suitably from 0.5 percent to 2 percent of the total weight of the alkyd and monomer components. The oxygen-providing compound may be added in small increments, an amount just sufficient being introduced each time to initiate and then to maintain the copolymerization reaction. However, it is advantageous generally to dissolve the entire amount of peroxide in the monomer or mixture of monomers prior to emulsification thereof; but, alternatively, it is also effective to add such peroxide to the emulsion.

The copolymerization reaction is effected by the redox method; so, in addition to the oxygen-providing substance described above, there is incorporated from time to time a small amount of a reducing agent, particularly sodium sulfoxylate formaldehyde $NaSO_2CH_2OH$. The reducing agent is added in a total amount, commonly, of from 0.1 percent to 1 percent, based on the total weight of alkyd and of monomer. Somewhat more may be used, if desired.

The reaction mixture is maintained, by addition more or less rapidly of the reducer, at a temperature of from about 0° C. (32° F.) to about 55° C. (131° F.). In general, it is most suitable and convenient to maintain the reaction temperature at about room temperature or somewhat above room temperature, for instance at from about 20° C. (68° F.) to about 45° C. (113° F.).

The unsaturated dibasic carboxylic acids, and anhydrides useful in this invention include maleic anhydride, fumaric acid, and itaconic acid, for example. In addition, (but not separately), some phthalic acid or anhydride may be used as a component, so long as it is used in quantities smaller than the quantities of the unsaturated dibasic acid.

The unsaturated fatty acids and esters containing the same which are useful in this invention include, for example, oleic, linoleic, and linolenic acids, methyl esters thereof, and their glycerides or drying oils, such as safflower, linseed, sunflower, soy, tung and fish oils, tall oil fatty acids and the like. The partial esters of these fatty acid components can be made with a polyalcohol such as glycerol, glycol, pentaerythritol, or sorbitol, or mixtures of such alcohols can be employed.

The oxygen-providing compound is advantageously a peroxide selected from the group consisting of hydrogen peroxide and organic peroxides, including cumenehydroperoxide (known also as CHP), diisopropylbenzene hydroperoxide (known also as DIBHP), benzoyl peroxide, and other peroxides with a similar decomposition range.

It is a great advantage of the present invention that it provides a method for making a high-molecular weight polymer, believed to be over 50,000, which includes an unsaturated fatty acid derivative, by emulsion polymerization at low temperature, i.e., at a reaction temperature of not over about 55° C. (131° F.) and advantageously at not over about 40° C. (104° F.). Copolymerization of unsaturated fatty acid derivatives with vinyl monomer to such high-molecular weight compounds has been very difficult, because free radical polymerization occurring with vinyl monomers has been greatly inhibited by the presence of unsaturated fatty acid derivatives. This is believed to have been due to the presence of the allylic group, as discussed above, but the present invention overcomes this effect. Important to this end is the use of the low-temperature redox reaction, with the peroxide as described as the free radical initiator. It is a further advantage that the copolymerization product of this invention provides tough films, exhibiting good homogeneity. An advantage of this invention is that, under the process conditions described, there is provided a very high rate of free radical formation, which overwhelms the tendency of the unsaturated fatty acid derivatives to absorb such radicals; therefore, there is an excess of the same to carry on the vinyl copolymerization. Thus, when a free radical initiates a growing vinyl chain, and this free radical on the growing end of such chain is absorbed by an allyl group of the unsaturated fatty acid, more free radicals initiated by the above system are available for and adapted to initiate again a growing polymer, thus continuing the polymerization.

A particular advantage of the product of this invention is that the copolymer of the unsaturated dibasic acid, unsaturated fatty acid partial ester-vinyl monomer is characterized by a long main composite chain or "backbone" of vinyl chains, from which depend groups of unsaturated fatty acid esters. It is a further practical advantage that these compounds can then be air dried or can be baked to form good coatings or films or thermoset products. The long carbon chain of the fatty acid contributes desirable properties to the compounds herein, such as good exterior weathering, good flexibility, good film formation and good adhesion.

There are given below some examples to illustrate some modes of practicing the present invention and to demonstrate the process and product thereof in some specific embodiments. Examples 1 through 12 illustrate the production of the alkyd and the remaining examples demonstrate the copolymerization process and the product obtained thereby.

EXAMPLE 1

1,650 parts by weight of nonbreak safflower oil were admixed with 350 parts by weight ethylene glycol and heated under a nitrogen blanket in a kettle fitted with a stirrer, thermometer, gas inlet tube and water-cooled reflux condenser. The temperature was raised to 390° F. and refluxing then started. 0.25 part by weight of litharge was then added as an alcoholysis catalyst, and refluxing continued. (Other alcoholysis catalysts commonly used in alkyd manufacture could be used, such as $Ca(OH)_2$ or LiOH or lithium soap.) Alcoholysis proceeded, as shown by rise in the reflux temperature to 440° F. At this point, the temperature was reduced to 390° F. and 828 parts by weight of maleic anhydride at 212° F. were added as a liquid to the reaction mass (colder maleic anhydride, even solid, might have been used equally well), and then 345 parts by weight additional ethylene glycol at room temperature were added, resulting in cooling the mixture to about 350° F. or lower. The reflux condenser was replaced by a fractionating column to separate the water formed from the ethylene glycol, and esterification proceeded by driving off water through the fractionating column. The esterification temperature was maintained within the range of 340° to 350° F. After about 7 hours at this temperature, the acid number was 18 and the reaction was complete. The alkyd recovered as a residue in the flask exhibited the following properties:

| | |
|---|---|
| Viscosity | 255 Stokes |
| Acid Number | 17.7 |
| Color (Gardner) | 2 + |

EXAMPLE 2

The same procedure was carried out as in example 1 except that nonbreak soy oil was used in place of the nonbreak safflower oil. Properties of the alkyd recovered were:

| | |
|---|---|
| Viscosity | 1,880 Stokes |
| Acid Number | 15 |
| Color (Gardner) | 4 + |

EXAMPLE 3

Alkali refined linseed oil was treated in the same manner as in example 1 and the recovered alkyd exhibited the following properties:

| | |
|---|---|
| Viscosity | 1,000 Stokes |
| Acid Number | 25 |
| Color (Gardner) | 5 |

EXAMPLE 4

A special type of safflower oil known as "oleinate" and characterized by having about 75 percent oleic fatty acid esters, about 15 percent linoleic fatty acid esters and about 10 percent saturated fatty acid esters, was reacted as shown in example 1 to make an alkyd having the following properties:

| | |
|---|---|
| Viscosity | 59 Stokes |
| Acid Number | 19 |
| Color (Gardner) | 3 |

EXAMPLE 5

Sunflower oil having an iodine value of 137 and a Gardner color of 7 was reacted as shown in example 1 and the alkyd recovered exhibited the following properties:

| | |
|---|---|
| Viscosity | 1,800 Stokes |
| Acid Number | 12 |
| Color (Gardner) | 4 |

EXAMPLE 6

1,700 parts by weight of nonbreak safflower oil and 548 parts by weight glycerine were heated to 390° F. in a flask fitted with stirrer, thermometer, and an azeotropic water takeoff trap, under a nitrogen blanket. One part by weight of litharge was added, and the temperature was then raised to 460° F. and held for 30 minutes, after which time no further alcoholysis could be observed. Then 200 parts by weight of phthalic anhydride were added and, when the temperature dropped to 400° F., 552 parts by weight of melted maleic anhydride were added slowly, while lowering the temperature to about 350° F., at which point about 100 parts by weight of toluene were added, and azeotropic refluxing was continued at 350° F. for about 2 hours, when the acid number was 39. The azeotropic apparatus was removed and the toluene blown off with a rapid stream of nitrogen through the alkyd product. When the acid number was 27, the reaction was discontinued. The properties of the alkyd were:

| | |
|---|---|
| Viscosity | Semisolid |
| Acid Number | 27 |
| Color (Gardner) | 6 |

This alkyd includes 200 parts of phthalic anhydride in addition to 552 parts of maleic anhydride, and it illustrates that minor amounts of phthalic anhydride can be used, so long as the major component is dibasic acid.

EXAMPLE 7

Using the same apparatus and method as shown in example 1, 825 parts by weight safflower oil and 165 parts by weight ethylene glycol were heated to 390° F. and then 0.12 part by weight of litharge was added. Refluxing was continued for about an hour, the reflux temperature reaching 445° F. Then the reaction mass was cooled to 390° F. and 490 parts by weight of cool (100° F. or lower) fumaric acid were added, followed by 173 parts by weight ethylene glycol at room temperature. The temperature dropped to about 350° F. and was maintained at 345° to 350° F. for 10 hours giving a clear light colored resin very similar in properties to that obtained in example 1, as follows:

| | |
|---|---|
| Viscosity | 460 Stokes |
| Acid Number | 15 |
| Color (Gardner) | 4+ |

EXAMPLE 8

Similarly to the above examples, 504 parts by weight safflower oil and 101 parts by weight of ethylene glycol were heated with 0.1 part litharge until the reflux temperature was 450° F. The temperature was reduced to 380° F., and 336 parts by weight of cooler itaconic acid were added, followed by 106 parts by weight ethylene glycol at room temperature. The temperature dropped and was maintained at about 350° F., and esterification proceeded for 11 hours until the acid number was 19.6. The properties of the product are as follows:

| | |
|---|---|
| Viscosity | 12.4 Stokes |
| Acid Number | 19.6 |
| Color (Gardner) | 7 |

EXAMPLE 9

1,580 parts by weight of tall oil fatty acids (low rosin content grade) and 720 parts by weight ethylene glycol and 149 parts by weight pentaerythritol were heated in a kettle fitted with a fractionating column; and water of esterification was taken off at 350°–380° F., until the acid number was about 17. Then 828 parts by weight of melted maleic anhydride were added, and esterification was continued at 340° to 350° F. until the acid number was 20. The properties of the product were as follows:

| | |
|---|---|
| Viscosity | 140 Stokes |
| Acid Number | 18 |
| Color (Gardner) | 7+ |

EXAMPLE 10

1,950 parts by weight of safflower oil were heated under a nitrogen blanket with 543 parts by weight of synthetic glycerol in a kettle fitted with a stirrer, thermometer, gas inlet tube, and steam heated reflux condenser. The temperature was raised to 390° F., and 1.0 part by weight of litharge was added. The temperature was then raised to 450° F. and held there for 30 minutes, at which time alcoholysis was complete. The temperature was then lowered to about 350° F. during addition of 621 parts by weight of melted maleic anhydride. The temperature was held at about 350° F., but no higher for 4 hours, water being driven off through the condenser by a small stream of nitrogen bubbling through the alkyd. At this time the acid number was 31 and the reaction was discontinued. The properties of the recovered alkyd were:

| | |
|---|---|
| Viscosity | Very viscous |
| Acid Number | 30 |
| Color (Gardner) | 4 |

EXAMPLE 11

1,650 parts by weight safflower oil were heated under a nitrogen blanket with 834 parts by weight ethylene glycol in a flask fitted with a stirrer, thermometer, gas inlet tube, and air-cooled reflux condenser. The temperature was raised to 390° F., and one part by weight lithium hydroxide monohydrate was added. The temperature was raised to 450° F. and held there for 30 minutes. Then the temperature was lowered to about 380° F. and 633 parts by weight melted maleic anhydride were added. The temperature dropped to and was held at 345° to 350° F. while a small stream of nitrogen was bubbled through the reaction mass to drive off the water of esterification. After 7 hours at this temperature the acid value was 17 and the reaction was complete. The properties of the recovered alkyd were:

| | |
|---|---|
| Viscosity | 40 Stokes |
| Acid | 16 |
| Color (Gardner) | 2 |

The alkyds formed in the manner described in examples 1–11 have proven excellent in the production of emulsion copolymers with polymerizable monomers of the vinyl type, as illustrated in the following examples. All of the alkyds described in examples 1–11 have been so copolymerized, and the following examples are only some of the things done.

EXAMPLE 12

This example demonstrates the emulsion copolymerization, and particularly by a two-stage process whereby two separate emulsions were made as shown below:

Emulsion A
150 g. distilled water
30 g. 50 percent aqueous solution of Igepal CO–990 (nonylphenol-polyethylene) glycol-(100 units condensate)

This solution was placed in a one-liter glass kettle fitted with a paddle stirrer, nitrogen inlet tube, thermometer and reflux condenser. 250 g. vinyl acetate monomer were slowly added to the stirred water-emulsifier solution forming an emulsion of vinyl acetate monomer in water.

Emulsion B 320 g. safflower maleic alkyd (as made in example 1)
100 g. vinyl acetate monomer The alkyd and monomer were dissolved in each other and 150 g. of this solution were placed in the bowl of a planetary mixer, which is very effective in making the proper oil-in-water type emulsion from a viscous material such as the alkyd-vinyl acetate solution.

Then 50 g. of a 50 percent aqueous solution of Igepal CO-990 were added to the alkyd-vinyl acetate solution, and the whole was thoroughly beaten and mixed together. Then 100 g. distilled water were added to the mixture while continuing the beating action and in a few seconds a very stiff mayonnaiselike oil-in-water emulsion was formed.

The remainder of the alkyd-vinyl acetate solution (270 g.) was slowly added to the already formed oil-in-water emulsion while beating was continued. This new emulsion still had mayonnaiselike characteristics and was an oil-water emulsion with a bluish color, indicating very small particle size.

Then 320 g. distilled water were slowly added to the emulsion while the beater turned at slow speed. This emulsion was gradually transformed to a very fluid oil-in-water emulsion with an average particle size of less than 1 micron.

The following sequence of addition was made to manufacture the copolymer:

Air was excluded from Emulsion A by bubbling therethrough a small stream of nitrogen. Then 1 cc. of water containing 0.018 g. $Fe(NO_3)_3 \cdot 9H_2O$ and 0.025 g. sodium salt of ethylene diamine tetraacetic acid (to complex the iron into a chelate) was added. Following this, 1.0 g. maleic anhydride was added, which lowered the pH of the emulsion to about 2.0. Then further additions to the mixture in the reaction vessel or flask were made as shown in table 1:

TABLE 1

| Time, hours | Temp., °F | 10% aqueous solutions sodium sulfoxylate formaldehyde | 35% aqueous $H_2O_2$ | Remarks |
|---|---|---|---|---|
| 0:00 | 71.6 | 5 cc | 5 cc | |
| 0:20 | 140 | 10 cc. (total) | | |
| 0:40 | 158 | | | Solids 32% (about 60% vinyl acetate reacted). |
| 1:00 | 109.8 | | | 450 g. B Emulsion started in. |
| 1:10 | 113 | 20 cc. (total) | | All B in. |
| 1:20 | 118.4 | 25 cc. (total) | | Solids 41% (about 70% of all V.A. copolymerized). |
| 1:30 | 123.8 | 35 cc. (total) | | Solids 43%. |

The solids content of 43 percent shows that at least 78 percent of the vinyl monomer had been converted to the polymer or copolymer.

The polymer emulsion was spread on a glass panel and the water evaporated, leaving a transparent film with some haze. This film was hard but had little cohesion, apparently because it did not coalesce well. However, when this film was heated at 248° F. for 30 minutes, it formed a very tough flexible film resembling a vinyl plastisol in properties.

EXAMPLE 13

This illustrates the emulsion copolymerization of vinyl acetate, ethylhexyl acrylate and safflower maleic alkyd. In the same manner as shown in example 12, the following two emulsions were made:

| A | B |
|---|---|
| 280 g. water | 120 g. safflower maleic alkyd (Example 1) |
| 33 g. 50 % aqueous solution CO-990 | |
| 220 g. vinyl acetate | 15 g. 50 % aq. soln. CO-990 |
| 60 g. ethylhexyl acrylate | 120 g. water |
| 0.5 g. maleic anhydride | |

These emulsions were polymerized as shown in table 2:

TABLE 2

| Time, hours | Temp., °F | 10% aqueous solution sodium sulfoxylate formaldehyde | 35% aqueous $H_2O_2$ | Remarks |
|---|---|---|---|---|
| 0:00 | 75.2 | | 5 cc | 1 cc. aq. sol'n of 0.018 g. $Fe(NO_3)_3 \cdot 9H_2O$ +0.025 g. Na salt of diamine tetraacetic acid added. |
| 0:08 | 87.8 | 1 cc | | |
| 0:30 | 108.8 | 1 | | Solids 18.6%. |
| 0:40 | 108.8 | 5 cc. (total) | | Solids 33%. |
| 1:40 | 78.8 | | | B started in. |
| 1:45 | 89.6 | 11 cc. (total) | | About ½B in. |
| 1:50 | 87.8 | 20 cc. (total) | | All B in. |
| 1:55 | 89.6 | | | Solids 40.5%. |
| 2:00 | 87.8 | 21 cc. (total) | | |
| 2:05 | 89.6 | | | |

Final solids content was 40.5 percent, indicating that at least 71 percent of the monomer had reacted. The pH of the final emulsion was 1.7. The emulsion had a smooth texture without lumps or particles.

A film of the emulsion produced above was dried on glass. This made a semitransparent soft film which was quite strong and elastic. It had an elongation of at least 100 percent with good recovery.

EXAMPLE 14

This demonstrates the emulsion copolymerization of vinyl acetate, vinylidene chloride and safflower maleic alkyd.

The following emulsions were made. A was made in the same manner as shown in example 12.

| A | B |
|---|---|
| 400 g. distilled water | 120 g. safflower maleic alkyd (example 1) |
| 34 g. 70 % solution Igepal CO-990 | 60 g. vinylidene chloride (No water was added to the solution. It was emulsified by adding to emulsion A.) |
| 220 g. vinyl acetate | |
| 0.5 g. maleic anhydride | |

These were polymerized as shown in table 3:

TABLE 3

| Time, hours | Temp., °F | 10% aqueous solution sodium sulfoxylate formaldehyde | 35% aqueous $H_2O_2$ | Remarks |
|---|---|---|---|---|
| 0:00 | 73.4 | | 5 cc | Emulsion A in reactor, 1 cc. solution 0.018 g. $Fe(NO_3)_3 \cdot 9H_2O$ and 0.025 g. sodium salt ethylene diamine tetraacetic acid was added. |
| 0:05 | 77 | 2 cc | | |
| 0:08 | 107.6 | | | |
| 0:30 | 121 | 4 cc. (total) | | |
| 0:38 | 127.4 | | | 20% solids. |
| 0:55 | 114.8 | | | B started in. |
| 1:03 | 89.6 | 10 cc. (total) | | All B in. |
| 1:05 | 96.8 | | 5 cc | 37% solids. |
| 1:45 | 102.2 | 24 cc. (total) | | |
| 2:15 | 86 | 34 cc. (total) | 5 cc | |
| 2:45 | 111.2 | 44 cc. (total) | | Solids 45.1%. |

This produced a dried film which was fairly hard. When this film was baked 120° C. for 30 minutes it was very tough and flexible and almost transparent. 45 percent solids indicates that at least 83 percent of the monomer had reacted.

EXAMPLE 15

Emulsion copolymerization. Styrene, butyl acrylate, and safflower maleic alkyd.

A planetary mixer was used to make an emulsion as follows: 50 g. water, 25 g. Gafac RE 960 (a nonylphenol polyethylene glycol condensate esterified with phosphoric acid) were mixed together to form a smooth syrupy liquid. Then 50 g. safflower maleic alkyd (example 1) was added to the above mixture while the mixing beater was revolving at high speed. This made a stiff mayonnaiselike oil-in-water emulsion. Then to this emulsion the following mixture was slowly added:

125 g. safflower maleic alkyd
175 g. styrene
150 g. butyl acrylate

This resulted in another stiff emulsion similar to above. To this 725 g. water was added slowly giving a fluid emulsion with very fine particle size.

This emulsion was placed in a glass flask fitted with a stirrer, thermometer, gas inlet tube. A nitrogen blanket was maintained over the stirred emulsion and 5 cc. 35 percent hydrogen peroxide was added. Then polymerization was carried out as shown in table 4:

TABLE 4

| Time, hours | Temp., °F. | 10% aqueous solution sodium sulfoxylate formaldehyde | Solids, percent | Remarks |
|---|---|---|---|---|
| 0:00 | 82.4 | 1.0 cc | | 1 cc. solution 0.018 g. $Fe(NO_3)_3 \cdot 3.9H_2O$ + 0.025% ethylene diamine tetraacetic acid sodium salt. |
| 0:20 | 89.6 | | 26.3 | |
| 0:50 | 88.7 | 2 cc. (total) | | |
| 1:40 | 89.6 | | 32.2 | |
| 2:20 | 96.8 | 4 cc. (total) | | |
| 3:05 | 95 | 5 cc. (total) | 33.6 | |
| 3:35 | 98.6 | | 34.0 | |

NOTE.—The reaction had polymerized 74% of all the available monomer.

down film. Baking of this film at 120° C. (248° F.) for 30 minutes resulted in an even harder and tougher film.

EXAMPLE 16—Emulsion Copolymerization

This example was the same as example 15 except the safflower-maleic alkyd had zirconium and cobalt driers dissolved in it before being mixed with the monomers and emulsified.

The same procedure was followed as shown in example 15 except that the 175 g. safflower maleic alkyd had 1.5 g. of 6 percent cobalt octoate and 3.0 g. zirconium octoate added to it before it was emulsified or mixed with the styrene and butyl acrylate and emulsified. The addition of driers did not affect the redox polymerization.

The final polymerized emulsion had a conversion of 76 percent. It formed a tough clear film when first laid down and air dried readily to an even tougher film. Baking also was enhanced by the driers.

This shows that driers may be added to the alkyd before emulsification and polymerization without a detrimental effect. There is a big advantage of the preaddition of driers, saving this step later on. Furthermore, the polymerized emulsion is stable to oxidation in the emulsified form but will oxidize (air dry) readily in film form.

EXAMPLE 17

Two-state addition of safflower maleic alkyd, styrene, butyl acrylate system.

The 27.4 percent solids indicated that 80 percent of all the monomer had reacted. The film of this emulsion was quite tough, very transparent and glossy.

Table 6 below sets forth results obtained with other oils or fatty acid maleic alkyds, as well as oil alkyds with other unsaturated dibasic acids. It also shows emulsion polymerizations performed with organic peroxides. A planetary mixer was used to mix the reactants, as above. Sodium sulfoxylate formaldehyde was employed as reducer in the amounts and manner shown in example 12. The peroxides were added in the amounts shown, by weight, based on the total of the alkyd,

| | A | B |
|---|---|---|
| Mixed in planetary mixer | 30 g. Gafac RE-960; 30 g. Tergitol NPX [1]; 60 g. 50% solution CO-990 in water; 160 g. water. | 60 g. Gafac RE-960; 110 g. water. |
| Added to emulsifiers in planetary mixer | 150 g. safflower maleic alkyd; 750 g. styrene; 600 g. butyl acrylate. | 850 g. safflower maleic alkyd; 100 g. styrene; 50 g. butyl acrylate. |
| | Made good mayonnaise; 3,450 g. water added slowly. | Made good mayonnaise; 2,290 g. water added slowly. |

[1] Tergitol NPX is an aqueous solution of nonylphenol polyethylene glycol (10 units) condensate.

1200 g. of A and 800 g. of B were reacted as shown in Table 5.

TABLE 5

| Time, hours | Temp., °F. | 10% aqueous solution sodium sulfoxylate formaldehyde | 30% aqueous $H_2O_2$ | Solids, percent | Remarks |
|---|---|---|---|---|---|
| 0:00 | 74.3 | 0.5 cc | 0.5 cc | | |
| 0:50 | 99.8 | | | 16.3 | |
| 1:05 | 98.6–87.8 | | 1.0 cc. (total) | | 800 g. B added. |
| 2:05 | 89.6 | 1.75 cc. (total) | | 23.3 | |
| 4:00 | 87.8 | 4.0 cc. (total) | | 27.4 | |

This was a nice small particle size polymerized emulsion. A dried film of the emulsion was very transparent and somewhat tough. It resembled an air dried alkyd film in properties. This film air dried in a week or so to a hard film. However, when the emulsion had driers added to it (such as 0.1 percent zirconium and 0.05 percent cobalt as metals based on the solids content), the resulting film air dried rapidly at room temperature to become much harder and tougher than the newly laid polyol, and monomer. Temperatures employed were in the ranges shown in the examples.

In the above description and in the claims, percentages and parts are by weight unless otherwise indicated. It will be understood that the specific description is given for purposes of illustration only and that variations can be made therein without departing from the scope of the appended claims.

Having now described the invention,

TABLE 6

| Oil or fatty acid alkyd | Percent | Monomer | Monomer | Emulsifier | pH | Peroxide | Wt. percent yield of polymers | Properties of polymer film |
|---|---|---|---|---|---|---|---|---|
| Alkyd of 55% soy oil, 45% ethylene glycol maleate (Example 2). | 30 | 55% vinyl acetate. | 15% butyl acrylate. | Gafac RE-960. | ca. 1.8 | $H_2O_2$ | 82 | Film sl. soft air dried. Baked 130° C. 30 mins. Became very tough. |
| Alkyd of 55% linseed oil, 45% ethylene glycol maleate (Example 3). | 34 | 33% styrene. | 33% butyl acrylate. | Igepal CO-990. | ca. 3.0 | $H_2O_2$ | 78 | Firm transparent film quite tough. Baked to tough rubbery film 130° C. 30 mins. Good adhesion to metal. |
| Alkyd of 55% low iodine number (75% oleic acid) safflower oil, 45% ethylene glycol maleate (Example 4). | 34 | do | do | do | ca. 3.0 | $H_2O_2$ | 70 | Tough transparent film. Good adhesion to metal. |
| Alkyd of tall oil fatty acid pentaerythritol ester, ethylene glycol maleate (Example 9). | 34 | do | do | do | ca. 3.0 | $H_2O_2$ | 84 | Do. |
| Alkyd of 55% sunflower oil, 45% ethylene glycol maleate (made in same procedure as shown in Example 1). | 34 | do | do | do | ca. 3.0 | $H_2O_2$ | 75 | Do. |
| Alkyd of 55% safflower oil, 45% ethylene glycol fumarate (Example 7). | 34 | do | do | do | ca. 3.0 | $H_2O_2$ | 80 | Do. |
| Alkyd of 55% safflower oil, 45% ethylene glycol itaconate (Example 8). | 34 | do | do | do | ca. 3.0 | $H_2O_2$ | 77 | Do. |
| Alkyd of 55% safflower oil, 45% ethylene glycol maleate. | 40 | 35% | 25% | do | ca. 3.0 | DIBHP [1] 0.5% dissolved in monomer mixture. | 65 | Tough film. Good adhesion to metal. Bakes to very tough film. |
| Do | | 35% | 25% | do | ca. 3.0 | CHP [2] 1.0% dissolved in monomer mixture. | 33 | Soft film. |

[1] DIBHP=di-isopropylbenzene hydroperoxide.  [2] CHP=cumene hydroxperoxide.

What is claimed is:

1. The method of preparing an improved copolymer of a vinyl monomer and an alkyd, which comprises:
    a. reacting the partial ester of a polyhydroxyalcohol and an unsaturated fatty acid or unsaturated fatty acid ester with an unsaturated dibasic acidic material chosen from the group consisting of maleic acid, maleic anhydride, fumaric acid and itaconic acid at a reaction temperature not exceeding 350° F. sufficient to form an alkyd of said ester and said acidic material, so as to avoid substantial linking together of the double bond in the dibasic acid material and the double bonds of the partial ester,
    b. reacting the resulting alkyd with vinylic monomer at a temperature of from about 32° F. to about 131° F., by redox reaction while in an aqueous emulsion, and
    c. recovering the resulting copolymer from the emulsion.

2. The method of claim 1 in which in addition to the unsaturated dibasic acid material there is an amount of phthalic acid or phthalic anhydride smaller than that of said acid material.

3. The method of claim 1 in which the said partial ester is reacted with the said dibasic acid material until the resulting alkyd has a viscosity of at least about 12 stokes and an acid number below about 25.

4. The method of claim 1 in which the said partial ester is reacted with the said dibasic acid in substantially stoichiometric amounts.

5. The method of claim 1 in which the said vinylic monomer is from the group consisting of vinyl acetate, ethylhexyl acrylate, vinylidene chloride, styrene and butyl acrylate.

6. The method of claim 1 in which the said vinyl monomer is from the group consisting of vinyl, styryl and acryloyl monomers.

7. The method of claim 1 in which a peroxide is added to the said aqueous emulsion in quantity sufficient to initiate the said redox reaction and cause copolymerization of the said alkyd with said vinylic monomers.

8. The method of claim 7 in which said peroxide is of the group consisting of hydrogen peroxide, cumenehydroperoxide and diisopropylbenzene hydroperoxide.

9. The method of claim 7 in which sodium sulfoxylate formaldehyde is added to the said aqueous emulsion in small increments sufficient to maintain the copolymerization reaction at temperatures below about 130° F.

10. The method of claim 1 in which chelated iron ions are added to the said aqueous reaction mixture in catalytic amounts below 0.01 percent sufficient to augment the copolymerization reaction.

11. The method of claim 1 in which the said aqueous emulsion has a pH below 4 during the redox reaction.

12. The method of preparing an improved copolymer of a vinyl monomer and an alkyd, which comprises:
    a. partially alcoholizing an unsaturated fatty acid ester with a polyhydroxylalcohol,
    b. reacting the resulting partial ester with an unsaturated dibasic acidic material chosen from the group consisting of maleic acid, maleic anhydride, fumaric acid and itaconic acid at a reaction temperature not exceeding 350° F. sufficient to form an alkyd of said ester and said acidic material, so as to prevent substantial linking together of the double bond in the dibasic acid material and the double bonds of the partial ester,
    c. reacting the resulting alkyd at a temperature of from about 32° F. to about 131° F. with vinylic monomer by redox reaction while in an aqueous emulsion, and
    d. recovering the resulting copolymer from the emulsion.

13. The method of claim 12 in which said fatty acid ester is partially alcoholized by reflux boiling with the said alcohol in the presence of an alcoholysis catalyst until a temperature of about 450° F. is attained.

14. The method of claim 12 in which said fatty acid ester is partially alcoholized by heating with said alcohol to a temperature of about 450° F. in the presence of a catalyst.

15. The method of preparing an improved copolymer of a vinyl monomer and an alkyd, which comprises:
    a. partially esterifying an unsaturated fatty acid with an excess of polyhydroxyalcohol,
    b. reacting the resulting partial ester with an unsaturated dibasic acidic material chosen from the group consisting of maleic acid, maleic anhydride, fumaric acid and itaconic acid at a reaction temperature not exceeding 350° F. sufficient to form an alkyd of said ester and said acidic material, so as to prevent substantial linking together of the double bond in the dibasic acid material and the double bonds of the partial ester, c. reacting the resulting alkyd at a temperature of from about 32° F. to about 131° F. with vinylic monomer by redox reaction while in an aqueous emulsion, and
d. recovering the resulting copolymer from the emulsion.

16. The method of preparing an improved copolymer of a vinyl monomer and an alkyd, which comprises:
   a. heating an unsaturated dibasic acid material chosen from the group consisting of maleic acid, maleic anhydride, fumaric acid and itaconic acid with the partial ester of (1) a polyol and (2) an unsaturated fatty acid or unsaturated fatty acid ester to a temperature not exceeding 350° F. sufficient to cause said dibasic material to react with said partial ester to form an alkyd and water,
   b. removing water formed during the reaction and continuing heating until reaction is complete,
   c. adding the resulting alkyd to an aqueous emulsion of a vinyl monomer while maintaining an emulsified condition,
   d. adding to the emulsion sufficient peroxide to initiate a redox reaction of copolymerization at a temperature of from about 32° F. to about 131° F. between the nonaqueous constituents of said emulsion, and
   e. adding to the emulsion in small increments sufficient sodium sulfoxylate formaldehyde to maintain the copolymerization at temperatures below about 130° F. until reaction is substantially complete.

17. The method of claim 16 in which the amount of the said alkyd added to the said aqueous emulsion is from 10 to 90 parts by weight of alkyd to 90 to 10 parts by weight of said vinyl monomer.

18. The method of forming an alkyd from unsaturated fatty acids and dibasic acids, useful in the production of high-molecular weight copolymers, which comprises:
   a. partially alcoholizing an unsaturated fatty acid ester with a polyhydroxylalcohol,
   b. mixing the resulting partial ester with an approximately stoichiometric amount of an unsaturated dibasic acid material chosen from the group consisting of maleic acid, maleic anhydride, fumaric acid and itaconic acid, and
   c. heating the resulting mixture to a temperature not substantially in excess of 350° F. sufficient to cause said partial ester to react with said acid material while not linking together, in substantial amount, the double bond of the dibasic acid material and the double bonds of the partial ester.

19. The method of claim 18 wherein, in addition to the dibasic acid material, an amount of phthalic acid or phthalic anhydride is used smaller than that of said acid material.

20. The method of forming an alkyd from unsaturated fatty acids and dibasic acids, useful in the production of high-molecular weight copolymers, which comprises:
   a. partially esterifying an unsaturated fatty acid with an excess of polyhydroxyalcohol,
   b. mixing the resulting partial ester with an approximately stoichiometric amount of an unsaturated dibasic acid material chosen from the group consisting of maleic acid, maleic anhydride, fumaric acid and itaconic acid, and
   c. heating the resulting mixture to a temperature not substantially in excess of 350° F. sufficient to cause said partial ester to react with said acid material without substantially linking together the double bond of said dibasic acid material with the double bonds of the partial ester.

21. The method of claim 22 wherein, in addition to the unsaturated dibasic acid material, an amount of phthalic acid or phthalic anhydride is used smaller than that of said acid material.

22. The method of preparing an alkyd useful in the production of high-molecular weight copolymers with vinylic monomers, which comprises:
   a. heating a mixture of about 2 to 5 parts of an unsaturated fatty oil and about 1 part of a polyalcohol in the absence of air at a temperature and for a time sufficient to raise the boiling point of the mixture to about 450° F., in the absence of substantial evaporation loss,
   b. adding about 1 to 3 parts of an unsaturated dibasic acidic material chosen from the group consisting of maleic acid, maleic anhydride, fumaric acid and itaconic acid and cooling the resulting mixture below about 350° F., and
   c. maintaining the temperature at about 350° F., while fractionating off water of esterification, until esterification is substantially complete, so that there is no substantial linking together of the double bond of the dibasic acid material and the double bonds of the product of step a.

23. The method of claim 22 in which the unsaturated fatty oil and polyalcohol are heated in the presence of effective amounts of an alcoholization catalyst.

24. The method of claim 22 in which the unsaturated fatty oil is selected from the group consisting of safflower, linseed, sunflower, soy, tung and tall oils, the fatty acids thereof, oleic, linoleic and linolenic acids, and the methyl esters thereof.

25. The method of claim 22 in which the polyalcohol is selected from the group consisting of glycerol, ethylene glycol, pentaerythritol and sorbitol.

26. In a process of preparing an alkyd useful in the production of high-molecular weight copolymers of vinylic monomers, the step comprising heating an approximately stoichiometric amount of an unsaturated dibasic acidic material chosen from the group consisting of maleic acid, maleic anhydride, fumaric acid and itaconic acid with the partial ester of
   a. a polyol and
   b. an unsaturated fatty acid or unsaturated fatty acid ester at a temperature not exceeding 350° F. sufficient to cause said dibasic material to react with said partial ester, while there is no substantial linking together of the double bond of the dibasic material with the double bonds of the partial ester.

* * * * *

PO-1050
(5/69)

UNITED STATES PATENT OFFICE
CERTIFICATE OF CORRECTION

Patent No. __3,620,989__    Dated __November 16, 1971__

Inventor(s) __Lowell O. Cummings__

It is certified that error appears in the above-identified patent and that said Letters Patent are hereby corrected as shown below:

Column 1, line 3 of title, ":" should read --;--; lines 21-22,
"(-CH$_2$-CH CH-)" should read --(CH$_2$-CH=CH-)--;

line 35, "acryloyl" should read --acrylyl. Column 6, line 73, "150 g." should read --250 g.--. Column 9, line 36 in Table 4,
"Fe(NO$_3$)$_3$3.9H$_2$O+" should read --Fe(NO$_3$)3.9H$_2$O + --.

Column 11, line 64, "acryloyl" should read --acrylyl--. Column 14, line 9, "claim 22" should read --claim 20--.

Signed and sealed this 23rd day of May 1972.

(SEAL)
Attest:

EDWARD M. FLETCHER, JR.
Attesting Officer

ROBERT GOTTSCHALK
Commissioner of Patents